US010620596B2

(12) United States Patent
Yanagita (10) Patent No.: US 10,620,596 B2
(45) Date of Patent: Apr. 14, 2020

(54) MAINTENANCE COMPONENT MANAGEMENT DEVICE, MAINTENANCE COMPONENT MANAGEMENT METHOD AND COMPUTER READABLE MEDIUM

(71) Applicant: FANUC CORPORATION, Minamitsuru-gun, Yamanashi (JP)

(72) Inventor: Akihiro Yanagita, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 144 days.

(21) Appl. No.: 15/836,211

(22) Filed: Dec. 8, 2017

(65) Prior Publication Data
US 2018/0173181 A1 Jun. 21, 2018

(30) Foreign Application Priority Data

Dec. 19, 2016 (JP) ................................ 2016-245082

(51) Int. Cl.
G05B 19/04 (2006.01)
G06Q 10/00 (2012.01)
(Continued)

(52) U.S. Cl.
CPC ......... G05B 19/0405 (2013.01); G05B 19/18 (2013.01); G05B 19/4184 (2013.01);
(Continued)

(58) Field of Classification Search
CPC ........................... G05B 19/0405; G05B 19/18; G05B 19/4184; G05B 2219/32226; G06Q 10/20; G06Q 10/06; Y02P 90/86; Y02P 90/14
See application file for complete search history.

(56) References Cited

U.S. PATENT DOCUMENTS 8,781,981 B1 * 7/2014 Kipersztok .............. G06N 5/00
706/14
9,467,500 B2 10/2016 Maturana et al.
(Continued)

FOREIGN PATENT DOCUMENTS

JP 2002-092439 3/2002
JP 2004-086734 3/2004
(Continued)

OTHER PUBLICATIONS

Peng Y., et. al.: Current status of machine prognostics in condition-based maintenance: a review. The International Journal of Advanced Manufacturing Technology. Sep. 1, 2010; 50(1-4): 297-313.
(Continued)

Primary Examiner — Yoshihisa Ishizuka
(74) Attorney, Agent, or Firm — Wenderoth, Lind & Ponack, L.L.P.

(57) ABSTRACT

The stockpiled number of maintenance components is more appropriately managed. A maintenance component management device (15) includes: an acquisition means (151) for acquiring, from a plurality of maintenance target devices (25) requiring maintenance using a maintenance component, information representing an operating state of each of the plurality of maintenance target devices (25); and a calculation means (152) for extracting information representing a factor of a main cause for performing maintenance using the maintenance component from the information representing the operating state thus acquired, and calculating a number of the maintenance components estimated as becoming necessary in order to maintain the plurality of maintenance target devices (25), based on the information representing the factor thus extracted.

7 Claims, 7 Drawing Sheets

(51) Int. Cl.
*G06Q 10/06* (2012.01)
*G05B 19/18* (2006.01)
*G05B 19/418* (2006.01)

(52) U.S. Cl.
CPC ............ *G06Q 10/06* (2013.01); *G06Q 10/20* (2013.01); *G05B 2219/32226* (2013.01); *Y02P 90/14* (2015.11); *Y02P 90/86* (2015.11)

(56) References Cited

U.S. PATENT DOCUMENTS

2008/0228314 A1   9/2008  Sjostrand et al.
2015/0081399 A1*  3/2015  Mitchell ............ G06Q 10/0639
                                                          705/7.38

FOREIGN PATENT DOCUMENTS

| JP | 2004-334507 | 11/2004 |
| JP | 2009-294702 | 12/2009 |
| JP | 2010-231375 | 10/2010 |
| WO | 01/073633 | 10/2001 |
| WO | 2013/186880 | 12/2013 |

OTHER PUBLICATIONS

Office Action dated Nov. 26, 2019 in DE Patent Application No. 102017222369.3.

* cited by examiner

MAINTENANCE COMPONENT MANAGEMENT DEVICE, MAINTENANCE COMPONENT MANAGEMENT METHOD AND COMPUTER READABLE MEDIUM

This application is based on and claims the benefit of priority from Japanese Patent Application No. 2016-245082, filed on 19 Nov. 2016, the content of which is incorporated herein by reference.

BACKGROUND OF THE INVENTION

Field of the Invention

The present invention relates to a maintenance component management device, maintenance component management method and computer readable medium for performing management of maintenance components.

Related Art

Industrial robots and machine tools used in a factory or the like are constituted by several mechanical components and electronic components. These mechanical components and electronic components are consumed with usage time. In addition, these mechanical components and electronic components may also fail without indication.

Therefore, in a case of using these industrial robots and machine tools, it is necessary to perform maintenance periodically, and replace the consumed or failed mechanical components and electrical components with normal mechanical components and electrical components. Hereinafter, components used for performing maintenance such as this normal mechanical component or electrical component are called "maintenance components".

One example of technology related to maintenance on such machine tools, etc. is disclosed in Patent Document 1. With the technology disclosed in Patent Document 1, whether or not a period at which to perform maintenance on any machine tool has arrived is determined based on the operating state of each of the machine tools.

Then, as a result of the determination, in the case of a machine tool for which the period to perform maintenance has arrived being present, the fact that the period to perform maintenance has arrived is displayed on the display of a numerical control device controlling this machine tool. It thereby becomes possible to notify that the period to perform maintenance has arrived to the user of the machine tool.

Patent Document 1:
Japanese Unexamined Patent Application, Publication No. 2004-334507

SUMMARY OF THE INVENTION

According to the technology disclosed in Patent Document 1, it is possible for a user to grasp the arrival of the period to perform maintenance. However, the technology disclosed in Patent Document 1 determines only one machine tool based on the operating information of this one machine tool. In other words, there is a problem in that it is not possible to make a determination for a plurality of machines in entirety, by statistically using the operating information of a plurality of machine tools.

In addition, in order to actually perform maintenance, maintenance components are required, and in the case of not having a maintenance component, it is not possible to perform maintenance in the first place. In other words, in order to perform maintenance properly, it is important to appropriately stockpile maintenance components necessitated for maintaining all of a plurality of machine tools prior to the period at which to perform maintenance arriving, and configure so as to be able to supply maintenance components anytime.

Conventionally, the service department supplying maintenance components of the maker of the machine tool, etc. has estimated the required number of these maintenance components based on the fluctuation in the number of maintenance components shipped from a service center in the past, statistical information of the market overall, experience of persons in charge, etc., and has stockpiled the number of maintenance components according to the estimation in the service center.

In addition, in the case of a large scale client, the maintenance components for use in-house are purchased in advance, and stockpiled in-house, rather than receiving the supply of maintenance components each time it happens from the service center of the maker. Also in this case, the required number is estimated and stockpiled based on past statistical information, etc. similarly to the maker.

However, with a method such that estimates the required number based on such past statistical information, etc., the actual operating state at the factory, etc. is not considered. For example, fluctuations in model configuration, fluctuations in operating environment, and operating state such as maintenance track record of the machine tool, etc. in which the maintenance components are being used are not considered.

For this reason, the precision of estimation becomes poor, and the error between the estimated number and number actually necessitated becomes larger. Then, it is necessary to stockpile a greater number of maintenance components than the estimated number as a margin based on this error, and wastefulness is produced.

Therefore, the present invention has an object of providing a maintenance component management device, maintenance component management method and maintenance component management program capable of more appropriately managing the stockpiled number of maintenance components.

A maintenance component management device (e.g., the maintenance component management device 15 described later) according to a first aspect of the present invention includes: an acquisition means (e.g., the statistical information acquisition unit 151 described later) for acquiring, from a plurality of maintenance target devices (e.g., the machine 25 described later) requiring maintenance using a maintenance component, information representing an operating state of each of the plurality of maintenance target devices; and a calculation means (e.g., the maintenance component required-number calculation unit 152 described later) for extracting information representing a factor of a main cause for performing maintenance using the maintenance component from the information representing the operating state thus acquired, and calculating a number of the maintenance components estimated as becoming necessary in order to maintain the plurality of maintenance target devices, based on the information representing the factor thus extracted.

According to a second aspect of the present invention, the maintenance component management device as described in the first aspect may be configured so that the acquisition means acquires the information representing the operating state for each of a first time period and a second time period, and the calculation means calculates the number of the maintenance components estimated as becoming necessary in order to maintain the plurality of maintenance target devices, based on contents of variation between the information representing the factor extracted from the information representing the operating state for the first time period, and the information representing the factor extracted from the information representing the operating state for the second time period.

According to a third aspect of the present invention, the maintenance component management device as described in the second aspect may be configured so that the calculation means calculates the number of the maintenance components estimated as becoming necessary in a time period of a predetermined length in the future, by quantifying the contents of variation, and multiplying a value thus quantified and the number of the maintenance components becoming necessary in a past time period of a predetermined length.

According to a fourth aspect of the present invention, the maintenance component management device as described in any one of the first to third aspects may be configured so that the information representing the factor includes any one or a combination of information related to a load applied to the maintenance component (e.g., factor Fp described later), information related to a surrounding environment of the maintenance component (e.g., factor Ft described later), and information related to a length of usage time of the maintenance component (e.g., factor Fl described later).

According to a fifth aspect of the present invention, the maintenance component management device as described in any one of the first to fourth aspects may be configured so that, in a case of using the same type of maintenance components for maintaining each of different types of maintenance target device, the calculation means calculates a number of the same type maintenance components of estimated as becoming necessary in order to maintain all of the different types of maintenance target devices, from information representing an operating state for each of the different types of maintenance target devices.

According to a sixth aspect of the present invention, the maintenance component management device as described in any one of the first to fifth aspects may be configured so that, in a case of a plurality of users causing the maintenance target devices to operate in a plurality of factories, the calculation means calculates a number of the maintenance components estimated as becoming necessary for maintaining the maintenance target devices, with the maintenance target device of any user as a target, or with the maintenance target device of any factory as a target.

A maintenance component management method according to a seventh aspect of the present invention is a maintenance component management method performed by a computer (e.g., the maintenance component management device 15 described later), the method including the steps of: acquiring, from a plurality of maintenance target devices (e.g., the machine 25 described later) that require maintenance using a maintenance component, information representing an operating state of each of the plurality of maintenance target devices; and extracting information representing a factor of a main cause for performing maintenance using the maintenance component from the information representing the operating state thus acquired, and calculating a number of the maintenance components estimated as becoming necessary for maintaining the plurality of maintenance target devices based on the information representing the factor thus extracted.

A maintenance component management program according to an eighth aspect of the present invention is a maintenance component management program for causing a computer to function as a maintenance component management device (e.g., the maintenance component management device 15 described later), the maintenance component management device including: an acquisition means (e.g., the statistical information acquisition unit 151 described later) for acquiring, from a plurality of maintenance target devices (e.g., the machine 25 described later) requiring maintenance using a maintenance component, information representing an operating state of each of the plurality of maintenance target devices; and a calculation means (e.g., the maintenance component required-number calculation unit 152 described later) for extracting information representing a factor of a main cause for performing maintenance using the maintenance component from the information representing the operating state thus acquired, and calculating a number of the maintenance components estimated as becoming necessary in order to maintain the plurality of maintenance target devices, based on the information representing the factor thus extracted.

According to the present invention, it becomes possible to more appropriately manage the stockpiled number of maintenance components.

DETAILED DESCRIPTION OF THE INVENTION

First, a summary of an embodiment of the present invention will be explained. An embodiment of the present invention constructs a machine information database for identifying each device which is a maintenance target, upon installation of devices which are maintenance targets. Subsequently, the operating state of each device that is a maintenance target is managed to be associated with this identification information in the management system of each factory. In addition, a central management device connected to the management system of each factory acquires information representing the operating state of devices that are maintenance target periodically from each factory, and constructs the statistical information database from the acquired information. Then, a maintenance component management device arranged in the service center of the maker calculates the number of maintenance components estimated as becoming necessary for maintenance, based on the information representing the operating state of devices that are maintenance targets stored in the statistical information database.

The maker or client using the device that is the maintenance target can appropriately manage the stockpiled number of maintenance components that should be stockpiled in the service center, in-house warehouse, etc., by referencing this number of maintenance components thus calculated.

In other words, according to the present embodiment, it is possible to solve the aforementioned problem of "enabling appropriate management of the stockpiled number of maintenance components". The above is a summary of the present embodiment.

Next, an embodiment of the present invention will be explained in detail by referencing the drawings. First, an explanation will be made for the configuration of the present embodiment overall by referencing FIG. 1.

Figure 1:
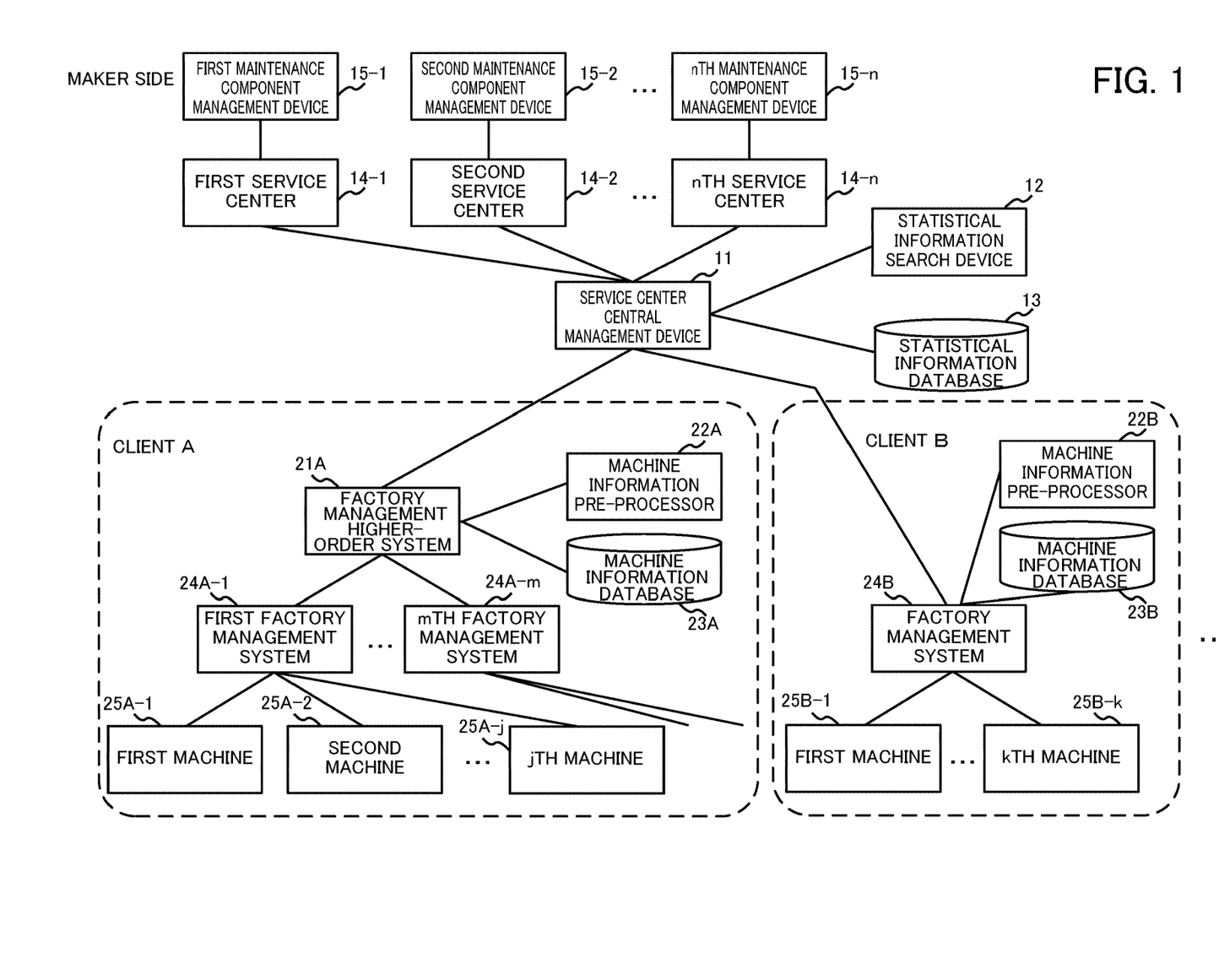
FIG. 1 is a block diagram showing the specific configuration of an overall embodiment of the present invention.

As shown in FIG. 1, the present embodiment includes a service center central management device 11, statistical information search device 12, statistical information database 13, plurality of service centers 14, and plurality of maintenance component management devices 15. These are systems used by the maker, which is the manufacturer of the industrial robot or machine tool.

In addition, the present embodiment further includes a factory management higher-order system 21A, machine information pre-processor 22A, machine information database 23A, plurality of factory management systems 24A, and plurality of machines 25A. These are systems used by a client A, which is a client using the machine tool.

Furthermore, the present embodiment further includes a machine information pre-processor 22B, machine information database 23B, plurality of factory management systems 24B, and plurality of machines 25B. These correspond to systems used by a client B, which is a client using the machine tool.

It should be noted that, in the drawings, n, m, j and k at the end of the reference symbols for the $n^{th}$ service center 14-$n$, $n^{th}$ maintenance component management device 15-$n$, $m^{th}$ factory management system 24A-m, $j^{th}$ machine 25A-j and $k^{th}$ machine 25A-k are each arbitrary natural numbers. In other words, in the present embodiment, it is possible to arbitrarily decide the numbers of respective systems and respective devices. In addition, although the drawings show systems used by the client A and client B, systems used by another client other than the client A and client B may also be present.

Each machine 25 is a device such as an industrial machine or machine tool installed in the factory. Each machine 25 includes a specific arithmetic processing unit, storage device, I/O device for the operator, etc., and can be controlled by software. It should be noted that, in the drawings, although each machine 25 is represented by one functional block, each machine 25 may be a combination of a plurality of devices such as a combination of an industrial robot or machine tool, and a numerical control device controlling these. In the present embodiment, each machine 25 is the target of maintenance, and the number of maintenance components required in maintenance of each machine 25 is estimated.

Each machine 25 includes a function of automatically detecting that a component constituting itself has been replaced with a new maintenance component. Then, each machine 225 having detected that a maintenance component was replaced stores the fact that the maintenance component was replaced as "maintenance history information".

For example, when the motor was replaced, since the encoder is reset, it is detected that the motor or encoder was replaced by this fact, and stores as maintenance history information. The contents of the maintenance history information stored are the maintenance component name replaced, and data/time of replacing the maintenance component, for example.

In addition, each machine 25 may include not only a function of automatically detecting and storing in this way, but also a function of accepting input of the fact of having replaced a maintenance component from an operator, and storing the fact of having replaced maintenance components as maintenance history information.

It should be noted that it may be configured so as to store only the replacement time/date of the maintenance component with the function of automatically detecting and storing, and store the maintenance component name replaced based on the subsequent input of the operator. In addition, it may be configured so that the function of automatically detecting and storing is not included, and to include only the function of storing based on the input from the operator.

In addition, each machine 25 includes various sensors in its own mechanical section, drive section and control section. For example, an encoder for measuring the position of each axis is included in each motor. Based on the position of each axis measured by this encoder, it is possible to calculate the speed and/or acceleration of each axis. In addition, it includes an amperometer, voltmeter or the like for measuring the torque of each motor, for example. Furthermore, it is possible to also arrange external temperature sensors or the like as necessary.

Then, each machine 25 creates information related to the operating conditions of each machine 25 (hereinafter referred to as "operating information") based on the measured values, etc. of these sensors. It should be noted that the aforementioned maintenance history information shall also be included in the operating information.

In addition, each machine 25 performs communication reciprocally with the factory management system 24 installed in the same factory, via a network such as LAN (Local Area Network), etc. established in the factory. For example, each machine 25 sends operating information for itself to the factory management system 24 periodically.

The factory management system 24 is installed in the factory, and is a system that manages each machine 25 in the factory in which itself is installed. The factory management system 24 acquires identification information of each machine 25, upon each machine 25 being installed. Then, the acquired identification information of each machine 25 is stored in the machine information database 23.

In addition, the factory management system 24 acquires the operating information periodically from each machine 25. Then, the acquired operating information is stored in the machine information database 23 in association with the identification information of each machine 25.

It should be noted that, in the case of the scale of the factory being large, a plurality of factory management systems 24 may be installed in one factory. In addition, a factory management system 24 may be installed in each of a plurality of factories, which are at locations remote from one client. In such a case, it may be configured so as to specially provide a higher-order management system, in order to collectively manage information acquired by a plurality of factory management systems 24.

For example, client A provides the factory management higher-order system 21, in order to collectively manage the information acquired by the first management system 24A-1, ..., $m^{th}$ management system A-m installed in the respective factories owned by themselves.

In a case of the factory management higher-order system 21 being present in this way, the factory management higher-order system 21 acquires identification information and operating information from each factory management system 24, and stores the respectively acquired information in the machine information database 23.

In any case, for each client, the machine information database 23 is constructed by information being stored for each of the respective machines 25 possessed by the client. A specific example of information stored in this machine information database 23 will be explained.

First, as identification information of each machine 25, the factory name to which each machine 25 belongs, line name, machine number in the line, machine name, date on which first operated, etc. are stored in the machine information database 23. This identification information is inputted to each machine 25 and/or factory management system 24 by the operator during installation of each machine 25.

Next, an explanation will be made for operating information stored in association with this identification information. The operating information includes information itemized below, for example.

<Example of Operating Information>

Operating accumulated time (accumulation of operating time each day)

weighted value of load at drive unit (average value, maximum/minimum value)

processing program name (spot welding, arc welding, painting, etc.)

operating state (operating time every day, cycle number (number of executed processing programs), etc.)

temperature information every day of each drive unit (e.g., motor) and within control device (average value, maximum/minimum value)

drive information every day of each drive unit, e.g., if drive unit is a motor, torque information of motor (maximum torque value, cumulative torque value (value from time-integrating torque value which varies minute by minute), duty cycle of every motor, in case of drive unit being motor qualities of supply voltage, etc. to machine (voltage, frequency, voltage fluctuation)

temporal change of aforementioned respective information maintenance history information (maintenance component name of maintenance component replaced in maintenance, date and time of replacing maintenance component, etc.)

As a specific example, in the case of the machine 25 being an injection molding machine, for example, the number of shots since operation start, maximum current value of motor driving the injection screw during injection, maximum current value of motor driving the clamping mechanism during clamping, maximum current value of motor driving ejector shaft, maximum current value during measurement of motor rotationally driving the screw, peak injection pressure, current cycle time of one molding cycle, measurement time, injection time, further maintenance history information, etc. are included in the operating information.

In addition, the factory management higher-order system 21 or factory management system 24 communicably connects with the service center central management device 11 via a WAN (Wide Area Network) outside the company such as the Internet. It should be noted that, with the communication connection, since information related to clients such as operating information of the factory is transmitted, it is preferable to ensure security by using technology such as a VPN (Virtual Private Network).

The respective machine information pre-processor 22 sends the respective information stored in the machine information database 23 to the maker's service center central management device 11 via the factory management higher-order system 21 or factory management system 24. Frequency at which this sending is performed is arbitrarily settable. For example, it is possible to perform at a frequency such as every day or every few days.

The service center central management device 11 stores identification information and/or operating information for the respective factories of each client, received from the respective machine information pre-processor 22.

The statistical information stored in this statistical information database 13 can be acquired and referenced by the service center central management device 11 or each maintenance component management device 15. In addition, upon acquisition, it is further possible to make a search based on specific search criteria, via the statistical information search device 12. For example, it is possible to search and acquire motor replacement number of cases in a specific month of a specific machine model of a specific client.

The service center 14 is a service center used by the supply department of the maker's maintenance components. A maintenance component management device 15 is installed in each of the service centers 14.

Each of the maintenance component management devices 15 acquires statistical information stored in the statistical information database 13. Then, each of the maintenance component management devices 15 calculates the number of maintenance components estimated as becoming necessary in the future, based on the acquired statistical information.

For example, based on the replaced number of maintenance components of a certain machine model in the same month of the previous year, and acquired statistical information, it is possible to calculate the number of maintenance components in proportion to the number of machines of this machine model, as the number of maintenance components estimated as becoming necessary in the future.

Herein, in the present embodiment, it is possible to precisely calculate the number of maintenance components estimated as becoming necessary, by giving consideration to the operating state of each machine 25 included in the statistical information (e.g., difference from year previous in load on motor and gears, difference in temperature, etc.). For this reason, the error between the estimated number and the number actually becoming necessary can be decreased.

In addition, the user of each service center 14 having referenced these calculation results becomes able to collect and stockpile in advance only the number of maintenance components estimated as becoming necessary. In other words, according to the present embodiment, it becomes possible to appropriately manage the stockpiled number of maintenance components.

Next, explanations will be made for specific configurations of each maintenance component management device 15 performing such calculations (first maintenance component management device 15-1, second maintenance component management device 15-2, ..., $n^{th}$ maintenance component management device 15-n) by referencing the block diagram of FIG. 2. It should be noted that, since the configurations of each of these maintenance component management devices 15 are shared, in the following explanation, explanations will be made by calling each maintenance component management device 15 as simply a maintenance component management device 15, without distinguishing therebetween.

Figure 2:
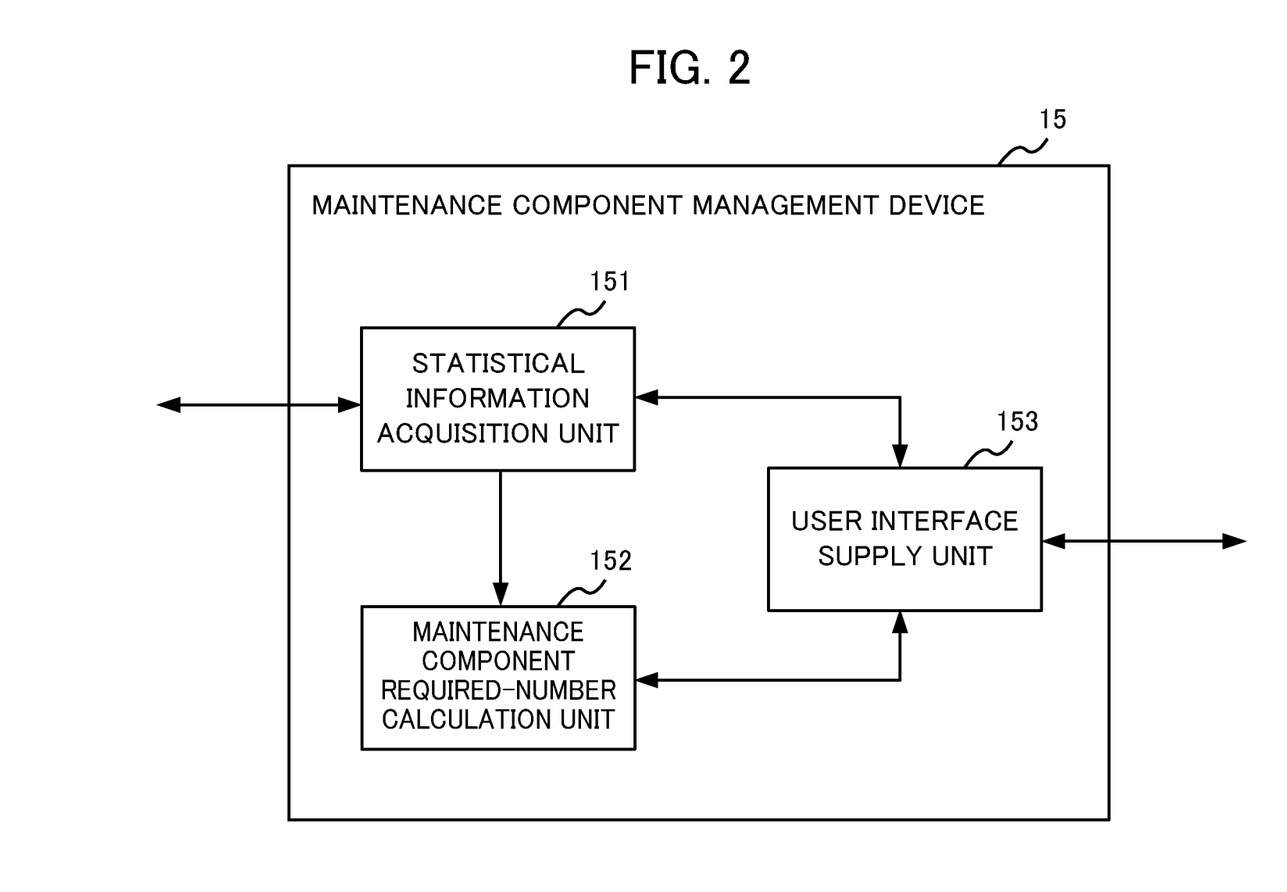
FIG. 2 is a block diagram showing a basic configuration of a maintenance component management device according to an embodiment of the present invention.

When referencing FIG. 2, the maintenance component management device 15 includes a statistic information acquisition unit 151, maintenance component required-number calculation unit 152, and user interface supply unit 153.

The statistical information acquisition unit 151 is a portion that acquires statistical information stored in the statistical information database 13. Acquisition of this statistical information may be performed periodically, or may be performed in response to a request of the maintenance component required-number calculation unit 152 upon the maintenance component required-number calculation unit 152 performing calculation. In addition, it may be configured so as to acquire all information stored as statistical information, or may be configured so as to search and acquire only information requested by the maintenance component required-number calculation unit 152. It is sufficient for this search to be performed using the statistical information search device 12, for example. In addition, it is sufficient for the search criteria to be accepted at the user interface supply unit 153.

In either case, the statistical information acquisition unit 151 outputs the acquired statistical information to the maintenance component required-number calculation unit 152 and user interface supply unit 153.

The maintenance component required-number calculation unit 152 calculates the number of maintenance components estimated to become necessary in the future, based on the statistical information outputted by the statistical information acquisition unit 151. This calculation is performed based on a predetermined calculation method. The specific contents of the calculation method will be explained upon explaining the operations during calculation by referencing the flowchart of FIG. 4. The maintenance component required-number calculation unit 152 outputs the calculated number of maintenance components estimated to become necessary in the future to the user interface supply unit 153.

The user interface supply unit 153 supplies a predetermined user interface to the user (for example, employee of service center) using the maintenance component management device 15. Then, according to this user interface, the display of information to the user and acceptance of manipulations from the user are performed.

For example, the user interface supply unit 153 accepts search criteria for searching statistical information. In addition, the user interface supply unit 153 displays statistical information acquired by the statistical information acquisition unit 151 to the user. In addition, the user interface supply unit 153 displays to the user the number of maintenance components estimated as becoming necessary in the future, displayed by the maintenance component required-number calculation unit 152. The user of each service center 14 can grasp the number of maintenance components estimated as becoming necessary in the future, by referencing this display.

The user interface supply unit 153, for example, is realized by a display device such as a display, and input equipment such as a mouse and keyboard. It should be noted that details of the user interface supplied by the user interface supply unit 153 will be described later by referencing FIGS. 5, 6 and 7.

The aforementioned maintenance component management device 15 can be realized by incorporating the distinctive software of the present embodiment into a general server device or personal computer. When explaining in further detail, the maintenance component management device 15 includes an arithmetic processing unit such as a CPU (Central Processing Unit) or the like. In addition, the maintenance component management device 15 includes an auxiliary storage device such as a HDD (hard disk drive) or SSD (solid state drive) storing various programs, and a main storage device such as RAM (Random Access Memory) for storing data that is temporarily necessitated upon the arithmetic processing unit executing a program.

Then, in the maintenance component management device 15, the arithmetic processing device reads out various programs from the auxiliary storage device, and performs the arithmetic processing based on these various programs, while expanding the various programs read out in the main storage device.

Based on this arithmetic processing, the functions of the aforementioned respective functional blocks are realized by controlling the hardware included by the maintenance component management device 15. In other words, the maintenance component management device 15 can be realized by hardware and software cooperating.

Explanations have been made above for the respective functions of each device included in the present embodiment.

Figure 3:
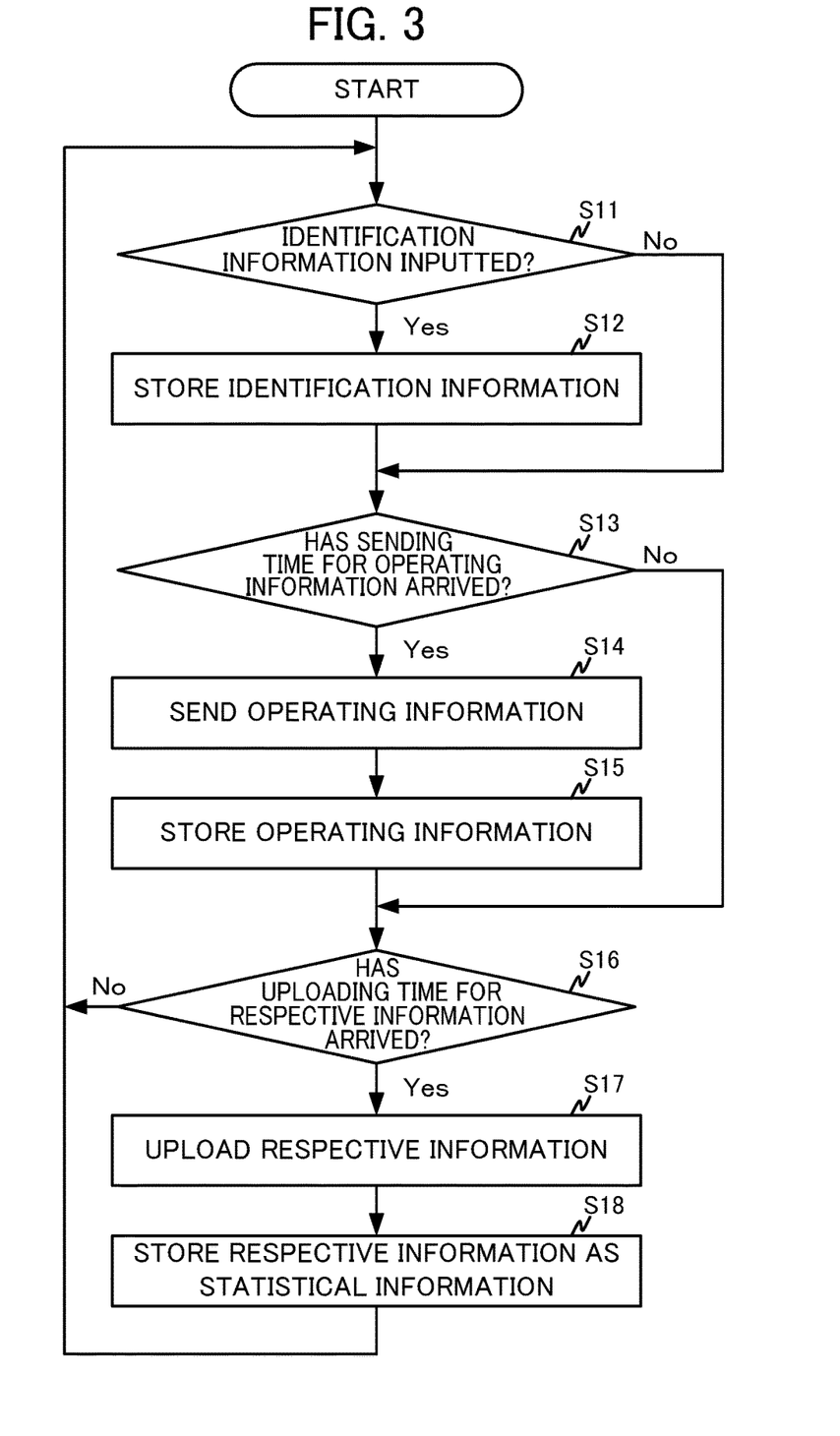
FIG. 3 is a flowchart showing operations from each machine being installed in a factory until statistical information is stored in a statistical information database according to an embodiment of the present invention.
Figure 4:
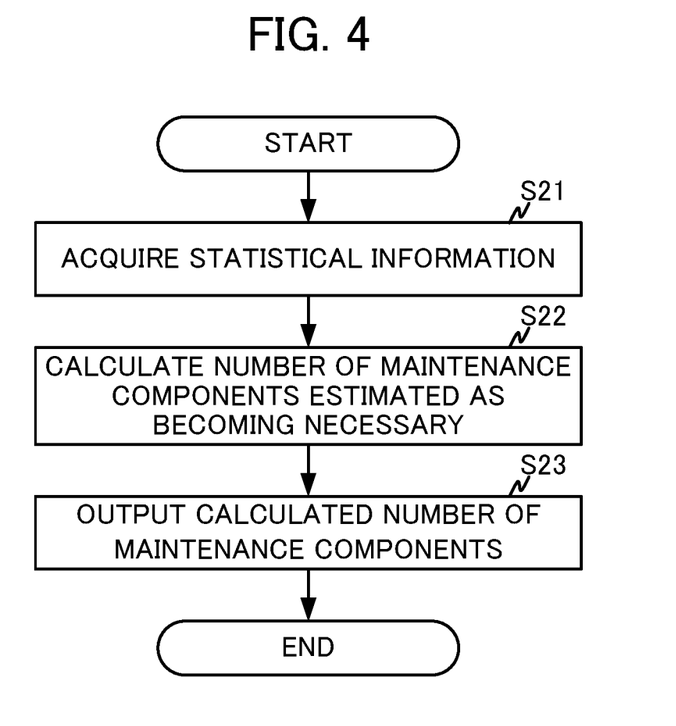
FIG. 4 is a flowchart showing operations upon calculating a number of maintenance components estimated as becoming necessary in the future, based on statistical information outputted by a statistical information acquisition unit according to an embodiment of the present invention.

Next, an explanation will be made for operations of the present embodiment by referencing the flowcharts of FIGS. 3 and 4.

First, an explanation will be made for operations from each machine 25 being installed in a factory until statistical information is stored in the statistical information database 13, by referencing the flowchart of FIG. 3.

First, the factory management system 24 determines whether the identification information has been newly inputted (Step S11). The input of identification information is performed by the operator during factory installation of each machine 25. It should be noted that input may be performed on each machine 25, or may be performed on the factory management system 24. Assuming a case of being performed on the machine 25, the inputted identification information is sent to the factory management system 24.

The contents of the identification information are the factory name to which the respective machines 25 belong, line name, machine number in the line, machine name, date on which operation started, etc., as mentioned above. It should be noted that, among this information, for example, the factory name, line name, etc. may be registered in advance in the factory management system 24 prior to installation of each machine 25.

In the case of identification information being newly inputted (YES in Step S11), the factory management system 24 stores the inputted identification information in the machine information database 23 (Step S12). Then, the processing advances to Step S13. On the other hand, in the case of there not being a new input of identification information (NO in Step S11), the processing advances to Step S13 without performing Step S12.

It should be noted that the present flowchart is for explaining solely the processing related to storage of identification information and operating information; therefore, although not particularly illustrated, in parallel with processing of the present flowchart, each machine 25 makes operations in the respective factories and each continues recording of its own operating information.

In Step S13, each machine 25 determines whether the time at which to send operating information to the factory management system 24 has arrived. Herein, although it is possible arbitrarily decide the time at which to send the operating information, for example, 0 hours in the morning every day is decided as the time to send the operating information.

In the case of the time at which to send the operating information having arrived (YES in Step S13), each machine 25 sends its own operating information to the factory management system 24 (Step S14). Then, the factory management system 24 having received the operating information from each machine 25 stores the received operating information in the machine information database 23 (Step S15). Then, the processing advances to Step S16.

On the other hand, in the case of the time at which to send the operating information to the factory management system 24 not having arrived, i.e. in the case of not being the time at which to send the operating information yet (NO in Step S13), the processing advances to Step S16 without performing Step S14 or Step S15.

In Step S16, the machine information pre-processor 22 determines whether or not the time at which to upload (send) the respective information stored in the machine information database 23 to the service center central management device 11 has arrived. Herein, although it is possible to arbitrarily decide the time at which to upload the operating information, it is configured so that each machine 25 sets a time after sending the operating information to the factory management system 24. For example, in a case of setting the time at which to upload the operating information for determination in Step S13 as 0 hours in the morning every day, it is configured so as to be a time after this. However, it is not necessarily required to perform uploading from the factor management system 24 to the service center central management device 11 at the same frequency as uploading of operating information to the factory management system 24 from each machine 25. For example, although uploading of operating information to the factory management system 24 from each machine 25 is performed at 0 hours in the morning every day, it may be configured so as to make uploading to from the factory management system 24 to the service center central management device 11 at a frequency of once in three days, etc.

In the case of the time at which to upload the respective information stored in the machine information database 23 to the service center central management device 11 having arrived (YES in Step S16), the respective information stored in the machine information database 23 is uploaded to the service center central management device 11 (Step S17). The service center central management device 11 receives this respective information, and stores as statistical information in the statistical information database 13 (Step S18). Then, the processing returns to Step S11, and repeats.

On the other hand, in the case of the time at which to upload the respective information stored in the machine information database 23 to the service center central management device 11 not having arrived, i.e. in the case of not becoming the time at which to make an upload yet (NO in Step S16), the processing returns to Step S11 and repeats without performing Step S17 or Step S18.

The above are the operations from the respective machines 25 being installed in the factory until the statistical information being stored in the statistical information database 13. It should be noted that in the case of the factory management higher-order system 21 managing a plurality of the factory management system 24 being present, the operations in the aforementioned flowchart for which the factory management system 24 is the main constituent are performed by the factory management higher-order system 21 becoming the main constituent.

Next, an explanation will be made in more detail for the upload in Step S17. In the present embodiment, uploading is performed by either of two methods among an on-demand method and a non-on-demand method.

Herein, the on-demand method is a method in which the service center central management device 11 obtains operating information decided in advance from the factory management system (from the machine information pre-processor 22) of the client periodically. In other words, it is a method where the service center central management device 11 becomes the main constituent and is dynamically performed. In the case of the on-demand method, it is possible to flexibly designate and request information necessitated by the service center central management device 11, and more meticulous analysis of the operating information becomes possible.

In contrast, the non-on-demand method is a method whereby the machine information pre-processor 22 uploads the operating information decided in advance periodically to the service center central management device 11. In other words, it is a method in which the machine information pre-processor 22 becomes the main constituent and is dynamically performed. For a reason in terms of security, the access (demand) from outside may be prohibited by the client, and in this case, the non-on-demand method is utilized. In the case of the non-on-demand method, only information decided based on the consent of the client in advance will be uploaded. For example, only information such as how many cases of replacement of which motor in which machine for a certain factory overall will be uploaded.

Herein, even if either of the on-demand method and non-on-demand method, in the case of there being a plurality of a certain model of machine 25 in this factory, the statistically collected operating information will be uploaded. In other words, the number of this certain model of machine 25 and the average value for the values of the respective operating information of this certain model will be uploaded. This is because, if the same model being used in the same factory, since it is considered to be used in the same way, it is possible to accurately calculate the number of maintenance components estimated as necessary based on the average value rather than basing on the individual values. It is thereby possible to decrease the data volume to send to the service center central management device 11.

However, in the case of there being surplus in the bandwidth in the communication pathway between the machine information pre-processor 22 and service center central management device 11, or the storage capacity of the statistical information database 13, it may be configured so as to upload all of the operating information of each of the machines 25.

Uploading of statistical information has been explained above. Next, an explanation will be made for operations performed by the maintenance component management device 15 during calculation of the number of maintenance components estimated as necessary in the future, by referencing the flowchart of FIG. 4.

Each of the respective maintenance component management devices 15 installed in the respective service centers 14 periodically performs calculation of the number of maintenance components estimated as necessary in the future in order to periodically determine whether the number of components in inventory is appropriate, and expand the assortment of maintenance components as necessary.

Future in this calculation is a period of a predetermined length in the future. Predetermined length, for example, is a length such as one month, or one quarter (i.e. three months). For example, it is possible to perform calculation of the number of maintenance components estimated as necessary over a month for the next month.

In addition, this calculation may be performed on a client basis, or a client factory basis. In this case, it is possible to grasp the number of maintenance components required for every client, or the number of maintenance components required for every factory. Furthermore, it may be performed for a plurality of clients. For example, it may be configured so that the maintenance component management device 15 in the service center 14 having jurisdiction over the Kansai region performs calculations for clients having a factory in the Kansai region. In this case, it is possible to grasp the number of required maintenance components as this service center 14. Furthermore, it may be performed for all clients. In this case, it is possible to grasp the number of required maintenance components as a maker overall.

Either way, the statistical information acquisition unit 151 of the maintenance component management device 15 acquires the statistical information required in calculation from the statistical information database 13 (Step S21). For example, if calculating for a certain client, the statistical information for each machine 25 installed in the respective factories of this client will be acquired.

Next, the maintenance component required-number calculation unit 152 performs calculation based on the statistical information acquired by the statistical information acquisition unit 151 (Step S22). The specific approach of the calculation is obtaining the actual value for how many components became required in the same period of the previous year, and multiplying a value arrived at by quantifying a factor for the main cause for performing maintenance using the maintenance component described later by this actual value.

Hereinafter, an explanation will be made taking an example of a case of calculating the number of a maintenance component A estimated as necessary in all factories of all clients in a region over which a first service center 14-1 has jurisdiction in June of this year. It should be noted that maintenance component A is a motor.

First, the statistical information acquisition unit 151 of the first maintenance component management device 15-1 acquires information of the same period of the previous year (June of the previous year) from the statistical information stored in the statistical information database 13. More specifically, for all factories of all clients in a region over which the first service center 14-1 has jurisdiction, the following information for June of the previous year relating to a certain machine 25 in which the maintenance component A is used is acquired.

<Example of Information Acquired for Same Period of Previous Year>

- Number of certain machines 25 operating
- Number of certain machines 25 in which maintenance component A was replaced (i.e. actual value for previous year)
- Average years use of certain machine 25
- Average years use of maintenance component A
- Temperature of usage environment of maintenance component A or certain machine 25
- Average operating hours of certain machine 25
- Other operating information, e.g., average/maximum torque value, cumulative torque value, duty cycle information of maintenance component A In addition, the statistical information acquisition unit 151 of the first maintenance component management device 15-1 acquires current information (past month according to type of information), from the statistical information stored in the statistical information database 13.

More specifically, for all factories of all clients in the region over which the first server center 14-1 has jurisdiction, the below current information (past month according to type of information) related to a certain machine 25 in which the maintenance component A is used is acquired.

<Example of Information Acquired Related to Current (Previous Month According to Type of Information)>

- Number of certain machines 25 operating
- Average years use of certain machine 25
- Average years use of maintenance component A
- Number of this component replaced in past month
- Fluctuation until now of usage environment temperature of maintenance component A
- Other operating information, e.g., average/maximum torque value, cumulative torque value, duty cycle of maintenance component A When the statistical information acquisition unit 151 acquires this information for the previous year and current, the maintenance component required-number calculation unit 152 extracts the actual values and respective factors from this information. Then, the number of maintenance components estimated as becoming necessary is calculated by substituting the extracted actual value and respective factors into the following (Formula 1).

$$\text{Number of maintenance components estimated as becoming necessary} = \text{previous year actual value} \times (Nc/Np) \times Fn \times Fp \times Ft \times Fl \times Fm \quad \text{(Formula 1)}$$

Herein, the meanings of respective factors in (Formula 1) are as follows. Previous year actual value: number of maintenance components replaced in same period of previous year Nc: number of machines currently in operation Np: number of machines during operation in same period of previous year Fn: number of maintenance components used in one machine; depending on the machine, since there are cases where a plurality of maintenance components are used in one machine, the number of maintenance components being used is set as the value of the factor in order to weight in accordance to this use number Fp: factor according to load fluctuation of maintenance component (in case of a motor, fluctuation in torque value and duty cycle fluctuation); since the possibility of replacement of maintenance components becoming necessary increases with heavier load, the value of the factor is set to a value of at least 1 in case of the load becoming heavier compared to previous year, and value of factor is set to less than 1 in case of load becoming lighter Ft: factor according to difference in environmental temperature from previous year; since the possibility of replacement of maintenance component becoming necessary rises as the environmental temperature rises, in the case of environmental temperature rising compared to previous year, value of factor is set to value of at least 1, and in case of environmental temperature lowering, value of factor is set to value less than 1

Fl: factor according to fluctuation in average years use of maintenance component; since possibility of replacement of maintenance component becoming necessary rises as average years use of maintenance component approaches average lifespan of maintenance component, in the case of average years use becoming longer compared to previous year, value of factor is set to at least 1, and in the case of average years use becoming shorter for a reason such as many maintenance components being replaced in previous year, value of factor set to value less than 1

Fm: margin for absorbing error in above calculation and ensuring sufficient number of maintenance components; e.g., if margin is set as 10 percent, value of factor set to 1.1

It should be noted that setting the values of these factors to values of at least 1 is the matter of determining to make more maintenance components necessary than the actual value of the previous year for this factor. In addition, setting the values of these factors to values less than 1 is the matter of determining that the maintenance components becoming necessary is less than the actual value of the previous year for this factor.

By configuring in this way, for the maintenance component A used in a certain machine 25, the number of maintenance components estimated as becoming necessary is calculated for all factories of all clients in a region over which the first server center 14-1 has jurisdiction in June of the current year.

However, in a case of the maintenance component A being used in another machine 25 besides the certain machine 25, acquisition of statistical information and calculation of the number of maintenance components A estimated as becoming necessary are performed as described above also for the maintenance component A used in this other machine 25.

Then, the sum of the numbers of maintenance components A calculated for each machine 25 becomes the number of maintenance components A estimated as becoming necessary for all factories of all clients in a region over which the first service center 14-1 has jurisdiction in June of the current year for the maintenance component A.

The maintenance component required-number calculation unit 152 outputs the number of maintenance components A estimated as becoming necessary calculated in this way to the user interface supply unit 153.

The user interface supply unit 153 outputs the number of maintenance components A estimated as becoming necessary calculated by the maintenance component required-number calculation unit 152 by a method such as displaying (Step S23). The user of the first service center 14-1 can thereby grasp the number of maintenance components A estimated as becoming necessary for all factories of all clients in the region over which having jurisdiction.

Then, the user can also grasp how many more maintenance components A need to be stockpiled until June, by comparing the grasped required number and the current stockpiled number.

Figure 5:
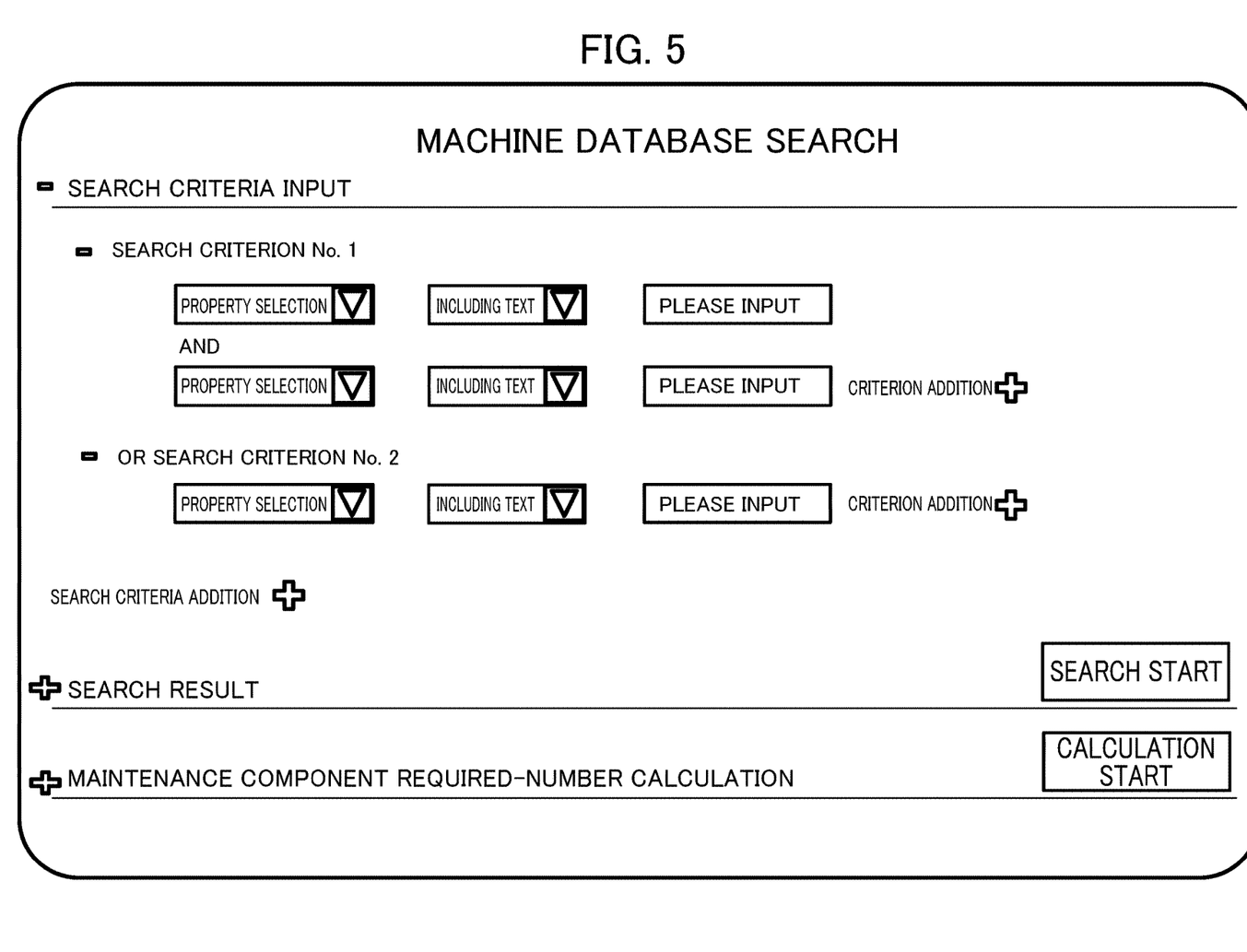
FIG. 5 is a view (1/3) showing an example of a user interface according to an embodiment of the present invention.
Figure 6:
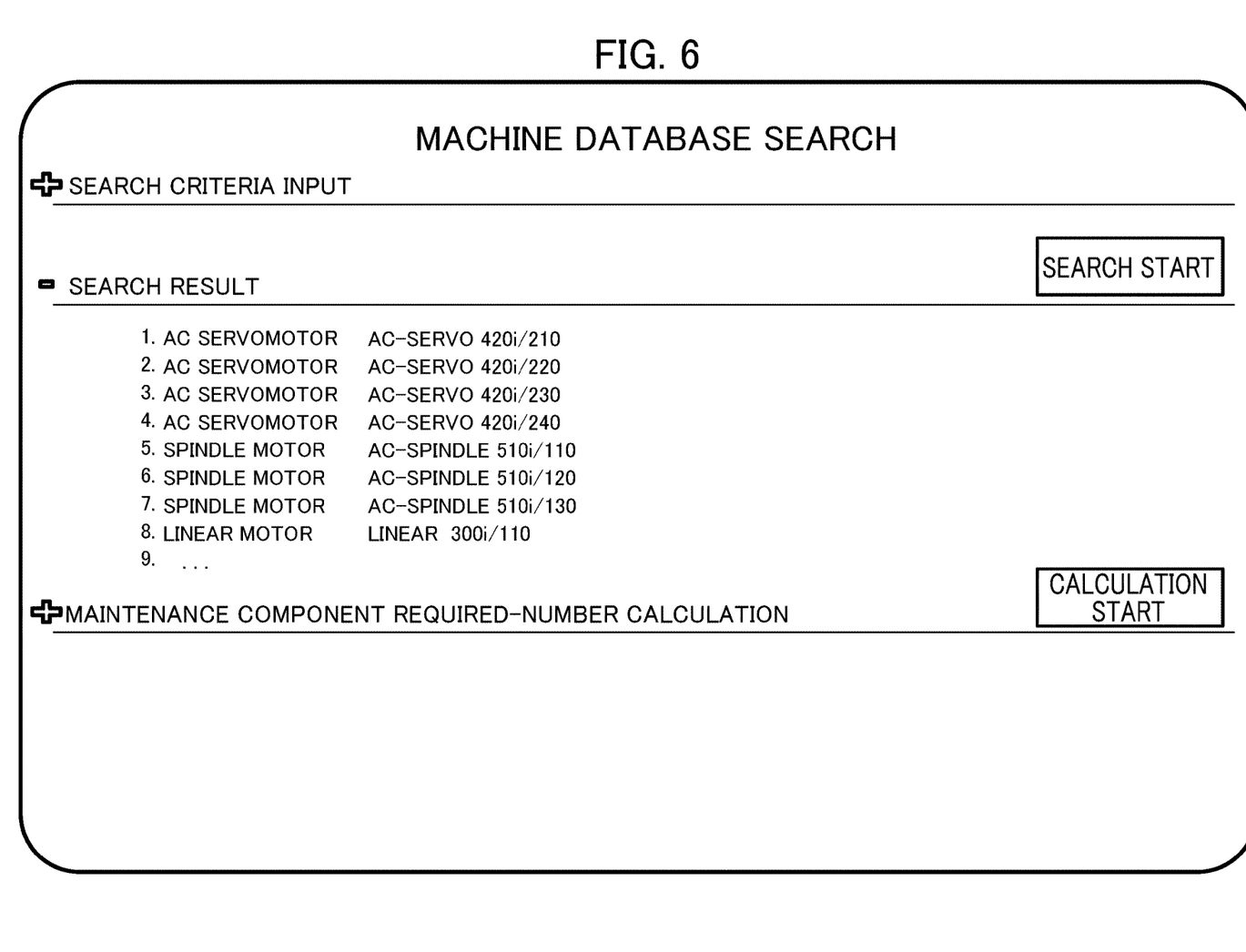
FIG. 6 is a view (2/3) showing an example of a user interface according to an embodiment of the present invention.
Figure 7:
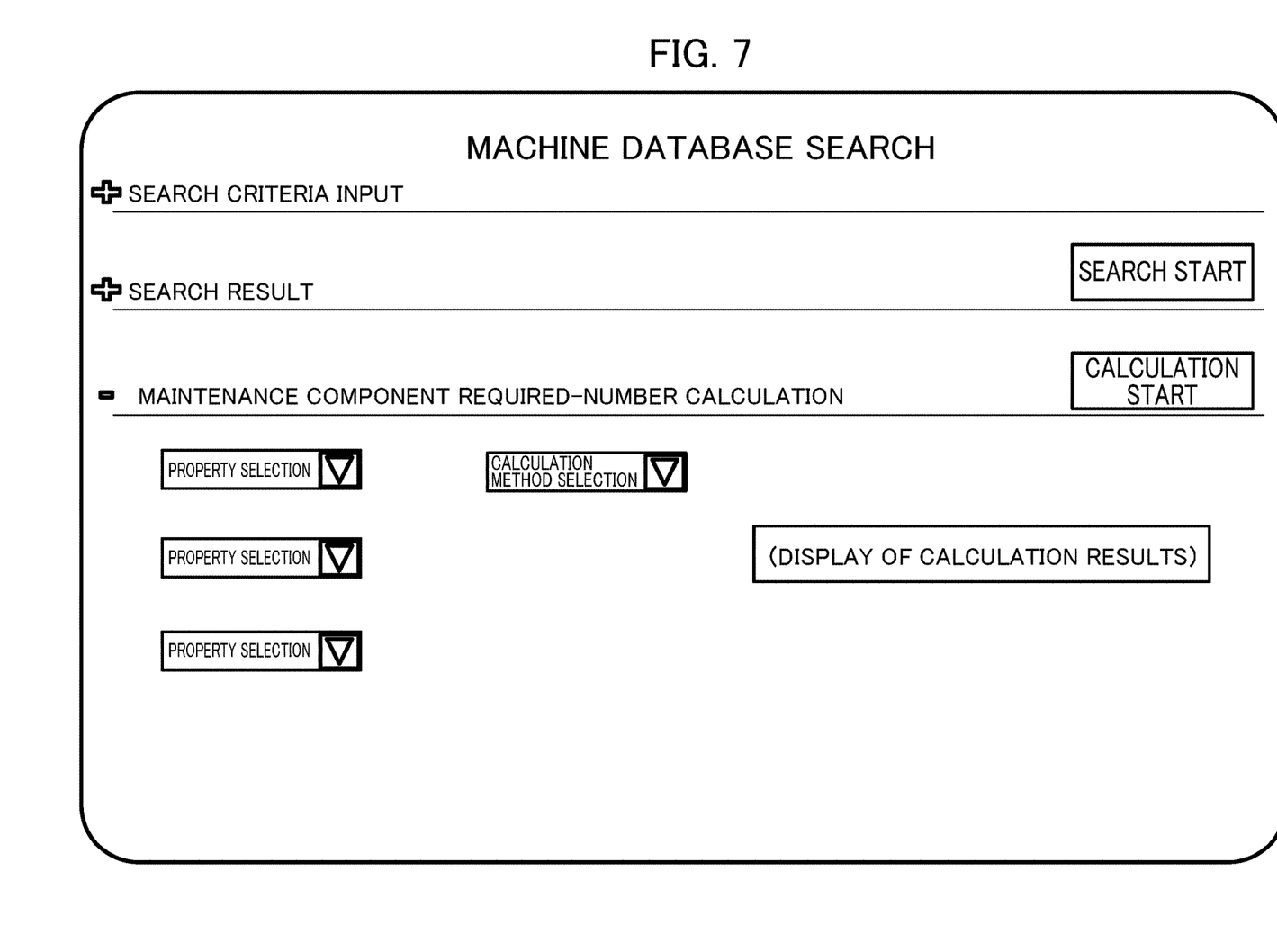
FIG. 7 is a view (3/3) showing an example of a user interface according to an embodiment of the present invention.

Next, an explanation will be made for the user interface upon executing Step S21 to Step S23 by referencing drawings representing examples of the user interfaces in FIGS. 5, 6 and 7. First, an explanation will be made for the user interface for performing acquisition of statistical information in Step S21.

As mentioned above, by utilizing the statistical information search device 12 in the present embodiment, it is possible to flexibly designate search criteria for retrieving statistical information stored in the statistical information database 13. More specifically, it is possible to designate a plurality of attributes (properties) defined by each machine 25 or each service part and the value thereof, and designate matter satisfying all of these ("AND" condition), matter satisfying any one among these ("OR" condition), and a combination of "AND" and "OR".

What is used in this designation is "search criteria input". If clicking the "+" mark prior to the heading of "search criteria input", the criteria input screen is enlarged, and it is possible to input various criteria. In addition, if clicking this when there is a "−" mark prior to the heading of "search criteria input", the criteria input screen will be minimize and no longer be visible.

(For items with a "+" or "−" mark, it is possible to switch the screen similarly between maximize and minimize in the same way below.)

Next, an explanation will be made for each item.

1. "property selection" can select one from the attributes defined in each machine or service part, by way of a drop-down menu.
2. "matching criterion" can select criteria such as only perfectly matching matters, including/not including text designated, value equal to/larger than/smaller than designated value.
3. "value input item" can designate search criteria by text input or numerical value input.
4.

In addition, is considered as matching when all criteria designated by one "search criterion" are satisfied ("AND" condition). By clicking the plus mark of "criteria addition", it is possible to add any number of criteria in one "search criterion".

It is also possible to define a plurality of "search criterion" defined in this way. More specifically, by clicking the plus mark of "search criteria addition", it is possible to newly add "search criterion". When there is a plurality of "search criterion" (e.g., "search criterion" No. 1, No. 2, etc.), it is regarded as matching when any one thereamong is agreeing. In other words, the determination as to whether or not agreeing when there is a plurality of "search criterion" is treated as an "OR" condition.

If the designation of all criteria could be done, when the button "search start" is pressed, all data satisfying the designated criteria are displayed as "search results".

An explanation will be made for the display of "search results" by referencing FIG. 6. This time, the results of searching a maintenance component that is the target of calculation in the maintenance component required-number calculation unit 152 is shown as "search results" based on the search criteria of FIG. 5. As illustrated, a list such as classification and/or model number of maintenance components matching the search criteria is shown as the search results. This is a list of maintenance components used by the machine 25 installed in the factory of a certain client, for example.

In order to perform calculation by way of the maintenance component required-number calculation unit 152 with these maintenance components as the target, the "+" button which is prior to the heading of "maintenance component required-number calculation" is pressed and the maintenance component required-number calculation is displayed to be enlarged. An explanation will be made for the user interface in the case of displaying the maintenance component required-number calculation to be enlarged.

It is possible to select a plurality of properties on this screen. For example, it is possible to select a maintenance component to be the target of a current calculation from a list of maintenance component such as explained by referencing FIG. 6. In addition, it is possible to select as properties any client for calculating, and any period for calculating.

Then, if designation of all properties for calculation could be made, when the "calculation start" button is pressed, the maintenance component required-number calculation unit 152 performs calculation according to the designated properties. For example, calculation is performed according to the three properties of "maintenance component A", "client A" and "June of this year". It is thereby possible to calculate the number of maintenance components estimated as becoming necessary according to the user's designation of properties. The calculated number of maintenance components is displayed in the item of "(display of calculation result)".

The present embodiment explained above exerts an effect in being able to accurately estimate the number of maintenance components estimated as becoming necessary in the future. In addition, an effect in that wastefully increasing the stockpile becomes unnecessary and it is possible to achieve efficient component supply is also thereby exerted. The reason thereof is because the factor that is the main cause of replacement of maintenance components is extracted from the actual operating state in a factory, etc., and calculation is performed by considering this factor.

In addition, the reason thereof is because calculation is performed statistically using the operating information for a plurality of machines, not by performing determination for only one machine, with the operating information of one machine, as in the technology disclosed in Patent Document 1.

In addition, according to the present embodiment, the effect is exerted in being able to calculate the number of maintenance components estimated as becoming necessary in the future, in the range desired by the user. For example, it is possible to make calculations with the desired time period as the target, the desired client as the target, and the desired factory as the target. The reason thereof is because the calculation of the number of maintenance components estimated as becoming necessary in the future is performed based on the conditions designated by the user.

Herein, since the way in which a robot or machine tool is used differs for every client and intended use, the maintenance components which tend to break are not necessarily the same for every client. A maintenance component having a trend of easily breaking in the usage method of a certain client may hardly break in the usage method of another client. Therefore, by performing calculation with the desired client as the target, for example, it is possible to adapt to the usage method of this client and accurately perform calculation.

It should be noted that each of the respective devices included in the above-mentioned maintenance component management system can be realized by hardware, software, or a combination of these. In addition, the maintenance component management method carried out by each of the respective devices included in the above-mentioned maintenance component management system can also be realized by hardware, software, or a combination of these. Herein, being realized by software indicates the matter of being realized by a computer reading out and executing programs.

The programs can be stored using non-transitory computer readable media of various types, and then supplied to the computer. Non-transitory computer readable media includes various types of tangible storage media. Examples of non-transitory computer readable media include magnetic media (for example, flexible disk, magnetic tape, hard disk drive), magneto-optical recording media (for example, magneto-optical disk), CD-ROM (Read Only Memory), CD-R, CD-R/W, and semiconductor memory (for example, mask ROM, PROM (Programmable ROM), EPROM (Erasable PROM), flash ROM, RAM (random access memory)). In addition, the programs may be supplied to the computer by way of various types of transitory computer readable media. Examples of transitory computer readable media include electrical signals, optical signals, and electromagnetic waves. Transitory computer readable media can supply programs to the computer via a wired communication path such as electrical lines and optical fiber, or a wireless communication path.

In addition, although the aforementioned embodiment is a preferred embodiment of the present invention, it is not to limit the scope of the present invention to only the abovementioned embodiments, and implementation in modes arrived at by conducting various modifications within a scope not departing from the gist of the present invention are possible.

For example, in the aforementioned embodiment, although explained by exemplifying the matter of performing processing with the machine tool, etc. employed in a factory as the target, the present embodiment may be configured so as to perform processing with other machines employed in a location other than the factory as the target.

In addition, it may be configured so as to modify the aforementioned Formula 1. For example, it may be configured so as to increase the number of factors included in the aforementioned Formula 1. For example, even if the same time period, the possibility of replacement of a maintenance component rises with longer cumulative operating time used in the time period. Therefore, the cumulative operating time may be set as one of the factors used in Formula 1. Then, it may be configured so as to set the value of the factor to a value of at least 1 in the case of the cumulative operating time lengthening compared to the previous year, and to set the value of the factor to a value less than 1 in the case of the cumulative operating time shortening. In addition, it may be configured so as to set a quality such as the supply voltage (voltage, frequency, voltage fluctuation) as one of the factors used in Formula 1. Then, it may be configured so as to set the value of the factor to at least 1 if the quality such as the supply voltage is rising from the previous year, and set the value of the factor to less than 1 if the quality such as the supply voltage is declining from the previous year. In addition, for example, it may be configured so as to perform calculation using only an arbitrary factor, without using all of the factors included in the aforementioned Formula 1. For example, the factor Fm has been used as the margin for absorbing error in calculation and ensuring a sufficient number of maintenance components in the aforementioned Formula 1. However, it may be configured so as not to use this factor Fm in the case of being able to calculate the number of maintenance components estimated as necessary with precision from other factors.

INDUSTRIAL APPLICABILITY

The present invention is widely suited to applications in the management of components. For example, it is suited to applications such as the management of maintenance components for machine tools in a factory.

EXPLANATION OF REFERENCE NUMERALS 11 service center central management device
12 statistical information search device
13 statistical information database
14 service center
15 maintenance component management device
151 statistical information acquisition unit 152 maintenance component required-number calculation unit
153 user interface supply unit
21 factory management higher-order system
22 machine information pre-processor
23 machine information database
24 factory management system
25 machine

What is claimed is:

1. A maintenance component management device comprising:
a memory configured to store a program; and
a processor configured to execute the program and control the maintenance component management device to:
acquire by signals, for each of a plurality of maintenance target devices requiring maintenance using a maintenance component, statistical information compiling an average value of operating information of a first time period and an average value of operating information of a second time period, the first time period being a time period prior to the second time period, and a number of the plurality of maintenance target devices, the number indicating how many operating maintenance target devices are present in each of the first time period and the second time period, respectively,
each of the plurality of maintenance target devices including sensors and each of the plurality of maintenance target devices generating operating information describing its own operating conditions based on measured values of these sensors, and
each of the plurality of maintenance target devices including one or more of an industrial robot, a machine tool, and a numerical control device controlling an industrial robot or a machine tool; and
extract, for each of the first time period and the second time period, information representing a factor of a cause associated with maintenance from the statistical information thus acquired for the first time period and the second time period, respectively, and the number of the plurality of maintenance target devices thus acquired for the first time period and the second time period, respectively,
quantify a value of contents of variation between the first time period and the second time period of the information representing the factor thus extracted, and
calculate a number of the maintenance components estimated as being necessary to maintain the plurality of maintenance target devices in a future time period, based on the value thus quantified and the number of maintenance components being necessary in the first time period.

2. The maintenance component management device according to claim 1, wherein the processor is further configured to execute the program and control the maintenance component management device to calculate the number of the maintenance components estimated as being necessary to maintain the plurality of maintenance target devices in the future time period, by multiplying the value thus quantified and the number of the maintenance components replaced in the first time period.

3. The maintenance component management device according to claim 1, wherein the information representing the factor includes any one or a combination of information related to a load applied to the maintenance component, information related to a surrounding environment of the maintenance component, and information related to a length of usage time of the maintenance component.

4. The maintenance component management device according to claim 1, wherein when using the same type of maintenance components for maintaining each of different types of maintenance target devices, a number of the same type maintenance components of estimated as being necessary in order to maintain all of the different types of maintenance target devices is calculated, from information compiling average values of operating information for each of the different types of maintenance target devices and the number of the plurality of maintenance target devices.

5. The maintenance component management device according to claim 1, wherein when a plurality of users cause the maintenance target devices to operate in a plurality of factories,
a number of the maintenance components estimated as being necessary for maintaining the maintenance target devices is calculated, with the maintenance target device of any of the plurality of users as a target, or with the maintenance target device of any of the plurality of factories as a target.

6. A maintenance component management method performed by a computer, the method comprising the steps of:
acquiring by signals, for each of a plurality of maintenance target devices requiring maintenance using a maintenance component, statistical information compiling an average value of operating information of a first time period and an average value of operating information of a second time period, the first time period being a time period prior to the second time period, and a number of the plurality of maintenance target devices, the number indicating how many operating maintenance target devices are present in each of the first time period and the second time period, respectively,
each of the plurality of maintenance target devices including sensors and each of the plurality of maintenance target devices generating operating information describing its own operating conditions based on measured values of these sensors, and
each of the plurality of maintenance target devices including one or more of an industrial robot, a machine tool, and a numerical control device controlling an industrial robot or a machine tool; and
extracting, for each of the first time period and the second time period, information representing a factor of a cause associated with maintenance from the statistical information thus acquired for the first time period and the second time period, respectively, and the number of the plurality of maintenance target devices thus acquired for the first time period and the second time period, respectively,
quantifying a value of contents of variation between the first time period and the second time period of the information representing the factor thus extracted, and
calculating a number of the maintenance components estimated as being necessary for maintaining the plurality of maintenance target devices in a future time period, based on the value thus quantified and the number of maintenance components being necessary in the first time period.

7. A non-transitory computer readable medium storing a maintenance component management program that causes a processor of a maintenance component management device, to execute:
acquiring by signals, for each of a plurality of maintenance target devices requiring maintenance using a maintenance component, statistical information compiling an average value of operating information of a first time period and an average value of operating information of a second time period, the first time period being a time period prior to the second time period, and a number of the plurality of maintenance target devices, the number indicating how many operating maintenance target devices are present in each of the first time period and the second time period, respectively, each of the plurality of maintenance target devices including sensors and each of the plurality of maintenance target devices generating operating information describing its own operating conditions based on measured values of these sensors, and each of the plurality of maintenance target devices including one or more of an industrial robot, a machine tool, and a numerical control device controlling an industrial robot or a machine tool; and extracting, for each of the first time period and the second time period, information representing a factor of a cause associated with maintenance from the statistical information thus acquired for the first time period and the second time period, respectively, and the number of the plurality of maintenance target devices thus acquired for the first time period and the second time period, respectively, quantifying a value of contents of variation between the first time period and the second time period of the information representing the factor thus extracted, and calculating a number of the maintenance components estimated as being necessary to maintain the plurality of maintenance target devices in a future time period, based on the value thus quantified and the number of maintenance components being necessary in the first time period.

* * * * *